(12) United States Patent
Zhang et al.

(10) Patent No.: US 11,888,552 B1
(45) Date of Patent: Jan. 30, 2024

(54) IMBALANCE COMPENSATION FOR UPLINK (UL)—MULTIPLE-INPUT AND MULTIPLE-OUTPUT (MIMO) TRANSMISSIONS

(71) Applicant: Apple Inc., Cupertino, CA (US)

(72) Inventors: Lijie Zhang, Beijing (CN); Zhiwei Wang, Beijing (CN); Lakshmi N. Kavuri, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/903,867

(22) Filed: Sep. 6, 2022

(51) Int. Cl.
| | | |
|---|---|---|
| *H04B 7/0413* | (2017.01) | |
| *H04B 7/06* | (2006.01) | |
| *H04B 17/336* | (2015.01) | |
| *H04W 72/21* | (2023.01) | |
| *H04W 72/54* | (2023.01) | |

(52) U.S. Cl.
CPC ......... *H04B 7/0413* (2013.01); *H04B 7/0632* (2013.01); *H04B 17/336* (2015.01); *H04W 72/21* (2023.01); *H04W 72/54* (2023.01)

(58) Field of Classification Search
CPC .. H04B 7/0413; H04B 17/336; H04B 7/0632; H04W 72/21; H04W 72/54
See application file for complete search history.

(56) References Cited

U.S. PATENT DOCUMENTS

| | | | |
|---|---|---|---|
| 7,633,923 B2 | 12/2009 | Gorokhov et al. | |
| 10,595,034 B2 | 3/2020 | Hattori et al. | |
| 2017/0366843 A1* | 12/2017 | Ko | H04N 21/4382 |

FOREIGN PATENT DOCUMENTS

WO    WO 2005125044 A1    12/2005

OTHER PUBLICATIONS

Haile et al. "Power imbalance induced BER performance loss under limited-feedback CoMP techniques." EURASIP Journal on Wireless Communications and Networking 2016.1: 1-10, Sep. 6, 2016.
Tarighat et al. "Compensation schemes and performance analysis of IQ imbalances in OFDM receivers." IEEE Transactions on Signal Processing 53.8: 3257-3268, Aug. 2005.

* cited by examiner

*Primary Examiner* — Rahel Guarino
(74) *Attorney, Agent, or Firm* — Sterne, Kessler, Goldstein & Fox P.L.L.C.

(57) ABSTRACT

Systems, methods, and apparatuses disclosed herein can compensate for imbalances between multiple transport streams of an uplink (UL)-multiple-input and multiple-output (MIMO) transmission. These systems, methods, and apparatuses can adjust one or more signal metrics of multiple recovered transport streams of the UL-MIMO transmission that are received in the presence of imbalances between the multiple transport streams of the UL-MIMO transmission. As an example, these systems, methods, and apparatuses can inject noise into one or more of the multiple recovered transport streams to adjust the one or more signal metrics of the multiple recovered transmission streams to lessen the imbalances between the multiple transmission streams.

20 Claims, 5 Drawing Sheets

IMBALANCE COMPENSATION FOR UPLINK (UL)—MULTIPLE-INPUT AND MULTIPLE-OUTPUT (MIMO) TRANSMISSIONS

BACKGROUND

Multiple-input and multiple-output (MIMO) technology utilizes multiple transmitting and multiple receiving antennas, also referred to as antenna ports, to communicate multiple transport streams of data over a radio link. Often times, the radio link can cause imbalances between the multiple transport streams of an uplink (UL)-MIMO transmission as the multiple transport streams of the UL-MIMO transmission propagate through the radio link. For example, noise from the radio link such as, thermal noise, burst noise, impulse noise, interference, signal strength variations known as fading, and/or phase shift variations to provide some examples, may introduce transmit power imbalances between the multiple transport streams of the UL-MIMO transmission. In addition, the propagation medium of radio link may cause the multiple transport streams of the UL-MIMO transmission to traverse through multiple communication paths, reflecting from different objects, surface areas, surface boundaries, and interfaces. Potential causes of multipath propagation may include, but are not limited, to atmospheric ducting, ionospheric reflection and/or refraction, and/or reflection from terrestrial objects such as mountains and/or buildings to provide some examples. A conventional base station may not be able recover data from the multiple transport streams of the UL-MIMO transmission in the presence of high imbalances, for example, greater than or equal to between fifteen (15) and sixteen (16) dBs of imbalances between signal-to-noise ratio (SNR) of the multiple transport streams of the UL-MIMO transmission.

SUMMARY OF DISCLOSURE

Some embodiments of this disclosure describe a base station including a transceiver coupled to a processor. The transceiver recovers a first recovered transport stream based upon receiving a first transport stream of an uplink (UL)-multiple-input and multiple-output (MIMO) transmission and a second transport stream of the UL-MIMO transmission, wherein the first transport stream and the second transport stream propagate through a first signal pathway of a radio link. The transceiver recovers a second recovered transport stream based upon receiving the first transport stream and the second transport stream, wherein the first transport stream and the second transport stream propagate through a second signal pathway of the radio link. The processor de-maps the first recovered transport stream and the second recovered transport stream to provide a first transport layer and a second transport layer, determines a first signal metric of the first transport layer and a second signal metric of the second transport layer, injects noise into the first transport layer based on the first signal metric being greater than or equal to the second signal metric to lessen an imbalance between the first transport stream and the second transport stream, and injects the noise into the second transport layer based on the first signal metric being less than the second signal metric to lessen the imbalance between the first transport stream and the second transport stream.

In some embodiments, the transceiver can be coupled to a first receiving antenna configured to receive the first transport stream and the second transport stream as the first transport stream and the second transport stream propagate through the first signal pathway of the radio link and a second receiving antenna configured to receive the first transport stream and the second transport stream as the first transport stream and the second transport stream propagate through the second signal pathway of the radio link.

In some embodiments, the processor can inject the noise into the first transport layer to lessen first signal metric to cause the first signal metric to be closer to the second signal metric to lessen an effect of the imbalance between the first transport stream and the second transport stream on the base station.

In some embodiments, the processor can determine a difference between the first signal metric and the second signal metric, inject the noise into the first transport layer based on the first signal metric being greater than or equal to the second signal metric and the difference being greater than or equal to an imbalance threshold, and inject the noise into the second transport layer based on the first signal metric being less than the second signal metric and the difference being greater than or equal to the imbalance threshold. In these embodiments, the processor does not inject the noise into the first transport layer or the second transport layer when the difference is less than the imbalance threshold.

In some embodiments, the first signal metric can include a first signal-to-noise ratio (SNR) of the first transport layer and the second signal metric can include a second SNR of the second transport layer. In these embodiments, the processor can generate the noise having a magnitude according to:

$$n = \frac{1}{\text{linear}(SNR_{value} - \text{SNR\_scalor})},$$

where n represents the magnitude, the $SNR_{value}$ represents a value, expressed in decibels (dBs), of a higher SNR between the first SNR and the second SNR, the SNR_scalor represents a predetermined value that is empirically determined, and the function linear ( ) represents a mathematical conversion from dB to linear.

Some embodiments of this disclosure describe a method performed by a base station. The method include de-mapping a first recovered transport stream and a second recovered transport stream to provide a first transport layer and a second transport layer, determining a first signal metric of the first transport layer and a second signal metric of the second transport layer, injecting noise into the first transport layer based on the first signal metric being greater than or equal to the second signal metric to lessen an imbalance between the first transport stream and the second transport stream, and injecting the noise into the second transport layer based on the first signal metric being less than the second signal metric to lessen the imbalance between the first transport stream and the second transport stream.

In some embodiments, the method can further include recovering a first recovered transport stream based upon processing a first transport stream of an uplink (UL)-multiple-input and multiple-output (MIMO) transmission and a second transport stream of the UL-MIMO transmission, wherein the first transport stream and the second transport stream propagate through a first signal pathway of a radio link and recovering a second recovered transport stream based upon processing the first transport stream and the second transport stream, as the first transport stream and the second transport stream propagate through a second signal pathway of the radio link.

In some embodiments, the injecting the noise into the first transport can include injecting the noise into the first transport layer to lessen first signal metric to cause the first signal metric is be closer to the second signal metric to lessen an effect of the imbalance between the first transport stream and the second transport stream on the base station.

In some embodiments, the method can further include determining a difference between the first signal metric and the second signal metric. In these embodiments, the injecting the noise into the first transport can include injecting the noise into the first transport layer based on the first signal metric being greater than or equal to the second signal metric and the difference being greater than or equal to an imbalance threshold. In these embodiments, the injecting the noise into the second transport can include injecting the noise into the second transport layer based on the first signal metric is less than the second signal metric and the difference is greater than or equal to the imbalance threshold.

In some embodiments, the method can further include not injecting the noise into the first transport layer or the second transport layer when the difference is less than the imbalance threshold.

In some embodiments, the first signal metric can include a first signal-to-noise ratio (SNR) of the first transport layer, and the second signal metric can include a second SNR of the second transport layer. In these embodiments, the method can further include generating the noise having a magnitude according to:

$$n = \frac{1}{\text{linear}(SNR_{value} - \text{SNR\_scalor})},$$

where n represents the magnitude, the $SNR_{value}$ represents a value, expressed in decibels (dBs), of a higher SNR between the first SNR and the second SNR, the SNR_scalor represents a predetermined value that is empirically determined through simulation, and the function linear ( ) represents a mathematical conversion from dB to linear.

Some embodiments of this disclosure describe a base station having a memory and a processor. The memory stores instructions. The processor executes the instructions stored in the memory. The instructions, when executed by the processor, configure the processor to de-map a first recovered transport stream and a second recovered transport stream to provide a first transport layer and a second transport layer, determine a first signal-to-noise ratio (SNR) of the first transport layer and a second SNR of the second transport layer, inject noise into the first transport layer based on the first SNR being greater than or equal to the second SNR to lessen an imbalance between the first transport stream and the second transport stream, inject the noise into the second transport layer based on the first SNR being less than the second SNR to lessen the imbalance between the first transport stream and the second transport stream, and after injecting the noise into first transport layer or the second transport layer, recover data from the first transport layer and the second transport layer.

In some embodiments, the base station can include a transceiver. In these embodiments, the transceiver can recover, using a first receiving antenna, a first recovered transport stream based upon receiving a first transport stream of an uplink (UL)-multiple-input and multiple-output (MIMO) transmission and a second transport stream of the UL-MIMO transmission, wherein the first transport stream and the second transport stream propagate through a first signal pathway of a radio link. In these embodiments, the transceiver can recover, using a second receiving antenna, a second recovered transport stream based upon receiving the first transport stream and the second transport stream, wherein the first transport stream and the second transport stream propagate through a second signal pathway of the radio link.

In some embodiments, the instructions, when executed by the processor, can configure the processor to inject the noise into the first transport layer to lessen first SNR to cause the first SNR is be closer to the second SNR to lessen an effect of the imbalance between the first transport stream and the second transport stream on the base station.

In some embodiments, the instructions, when executed by the processor, can configure the processor to determine a difference between the first SNR and the second SNR, inject the noise into the first transport layer based on the first SNR being greater than or equal to the second SNR and the difference being greater than or equal to an imbalance threshold. and inject the noise into the second transport layer based on the first SNR being less than the second SNR and the difference is greater than or equal to the imbalance threshold.

In some embodiments, the instructions, when executed by the processor, can configure the processor to not inject the noise into the first transport layer or the second transport layer when the difference is less than the imbalance threshold.

In some embodiments, the instructions, when executed by the processor, can configure the processor to generate the noise having a magnitude according to:

$$n = \frac{1}{\text{linear}(SNR_{value} - \text{SNR\_scalor})},$$

where n represents the magnitude, the $SNR_{value}$ represents a value, expressed in decibels (dBs), of a higher SNR between the first SNR and the second SNR, the SNR_scalor represents a predetermined value that is empirically determined through simulation, and the function linear ( ) represents a mathematical conversion from dB to linear.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the disclosure and, together with the description, further serve to explain the principles of the disclosure and enable a person of skill in the relevant art(s) to make and use the disclosure.

The disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Overview

Systems, methods, and apparatuses disclosed herein can compensate for imbalances between multiple transport streams of an uplink (UL)-multiple-input and multiple-output (MIMO) transmission. These systems, methods, and apparatuses can include a user equipment (UE) to transmit the UL-MIMO transmission to an access node (AN) over a radio link. The radio link can cause imbalance between the multiple transport streams of the UL-MIMO transmission as the multiple transport streams propagate through the radio link. These systems, methods, and apparatuses can reactively adjust one or more signal metrics of multiple recovered transport streams of the UL-MIMO transmission that are received over the radio link in the presence of the imbalances between the multiple transport streams of the UL-MIMO transmission. As an example, these systems, methods, and apparatuses can inject noise into one or more of the multiple recovered transport streams to reactively adjust one or more signal metrics of the multiple recovered transmission streams to lessen the imbalances between the multiple transmission streams. Alternatively, or in addition to, these systems, methods, and apparatuses can proactively adjust one or more signal metrics of the multiple transport streams of the UL-MIMO transmission. As an example, these systems, methods, and apparatuses can attenuate and/or amplify transmit powers of one or more the multiple transport streams for the UL-MIMO transmission to proactively adjust one or more signal metrics of the multiple transmission streams to lessen the imbalances between the multiple transmission streams for the UL-MIMO transmission.

In some embodiments, the aspects of this disclosure can be performed by a network and/or a user equipment (UE) that operates according to $5^{th}$ generation (5G) wireless technology for digital cellular networks as defined by 3rd Generation Partnership Project (3GPP). Additionally, or alternatively, the aspects of this disclosure can be performed by a network and/or a UE that operates according to the Release 15 (Rel-15), Release 16 (Rel-16), Release 17 (Rel-17), Rel-17 new radio (NR), or others. However, the aspects of this disclosure are not limited to these examples, and one or more mechanisms of this disclosure can be implemented by other network(s) and/or UE(s).

Figure 1:
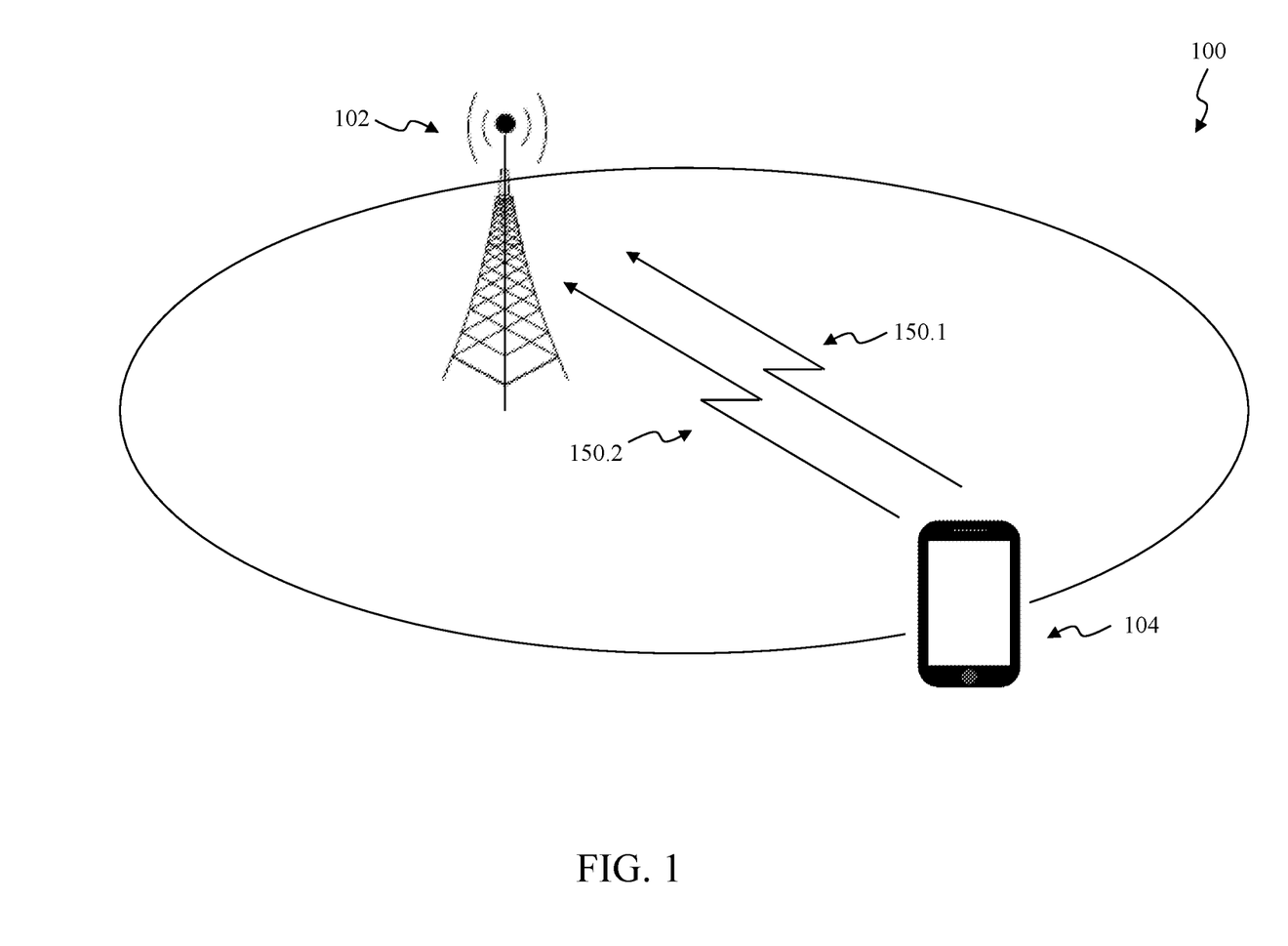
FIG. 1 graphically illustrates an exemplary wireless network for lessening an imbalance between two transport streams of an UL-MIMO transmission in accordance with various embodiments of the present disclosure.

Exemplary Wireless Network for Lessening an Imbalance Between Two Transport Streams of an UL-MIMO Transmission FIG. 1 graphically illustrates an exemplary wireless network for lessening an imbalance between two transport streams of an UL-MIMO transmission in accordance with various embodiments of the present disclosure. A wireless network 100 as illustrated in FIG. 1 is provided for the purpose of illustration only and does not limit the disclosed aspects.

The wireless network 100 may include, but is not limited to, a network node 102, for example, a base station (BS) such as a Next Generation Node BS (gNB), a radio access node (RAN), an evolved NodeB (eNB), a NodeB, a Road Side Unit (RSU), and/or a Transmission Reception Points (TRxP or TRP), and the like and an electronic device 104, for example, a UE such as a consumer electronics device, a cellular phone, a smartphone, a feature phones, a tablet computer, a wearable computer device, a personal digital assistant (PDA), pager, a wireless handset, a desktop computer, a laptop computer, an in-vehicle infotainment (IVI), an in-car entertainment (ICE) device, an Instrument Cluster (IC), a head-up display (HUD) device, an onboard diagnostic (OBD) device, a dashtop mobile equipment (DME), a mobile data terminal (MDT), an Electronic Engine Management System (EEMS), an electronic/engine control units (ECU), an electronic/engine control module (ECM), an embedded system, a microcontroller, a control module, an engine management system (EMS), a networked or "smart" appliance, a Machine-Type-Communication (MTC) device, a Machine-to-Machine (M2M) device, an Internet of Things (IoT) device, and the like. The electronic device 104, hereinafter referred to as UE 104, can be configured to operate based on a wide variety of wireless communication techniques. These techniques can include, but are not limited to, techniques based on 3rd Generation Partnership Project (3GPP) standards. For example, the UE 104 can be configured to operate using Rel-15, Rel-16, Rel-17 or other. The network node 102, herein referred to as a base station 102 or a cell 102, can include one or more nodes configured to operate based on a wide variety of wireless communication techniques such as, but not limited to, techniques based on 3GPP standards. For example, the base station 102 can include one or more nodes configured to operate using Rel-15, Rel-16, Rel-17 or others.

According to some aspects, the UE 104 can be connected to and can communicate with the base station 102 over a radio link. In the exemplary embodiment illustrated in FIG. 1, the radio link can include one or more downlink communication channels, for example, a Physical Downlink Control Channel (PDCCH) and/or a Physical Downlink Shared Channel (PDSCH), and/or one or more uplink communication channels, for example, a Physical Uplink Control Channel (PUCCH) and/or a Physical Uplink Shared Channel (PUSCH). In this exemplary embodiment, the PDCCH and the PUCCH represent downlink and uplink control channels, respectively, that carry control information between the UE 104 and the base station 102. In this exemplary embodiment, the PDSCH and the PUSCH represent downlink and uplink channels, respectively, that carry data information between the UE 104 and the base station 102. As used herein, the terms downlink, DL, or the like refer to the direction from the base station 102 to the UE 104. The term uplink, UL, or the like refer to the direction from the UE 104 to the base station 102.

In the exemplary embodiment illustrated in FIG. 1, the UE 104 and the base station 102 can be implemented using multiple-input and multiple-output (MIMO) technology. MIMO technology utilizes multiple transmitting and multiple receiving antennas, also referred to as antenna ports, to communicate multiple transport streams of data between the UE 104 and the base station 102 over multiple signal pathways of the radio link. As illustrated in FIG. 1, the UE 104 can use a first transmitting antenna to communicate a first transport stream 150.1 of an UL-MIMO transmission over a first signal pathway of the radio link to the base station 102 and a second transmitting antenna to communicate a second transport stream 150.2 of the UL-MIMO transmission over a second signal pathway of the radio link to the base station 102. In some embodiments, the radio link can cause imbalances, for example, transmit power imbalances, between the first transport stream 150.1 and the second transport stream 150.2 of the UL-MIMO transmission as the first transport stream 150.1 and the second transport stream 150.2 propagate through the radio link. For example, noise from the radio link such as, thermal noise, burst noise, impulse noise, interference, signal strength variations known as fading, and/or phase shift variations to provide some examples, may introduce imbalances between the first transport stream 150.1 and the second transport stream 150.2. In addition, the propagation medium of radio link may cause the first transport stream 150.1 and the second transport stream 150.2 to reach the base station 102 by multiple communication paths, reflecting from different objects, surface areas, surface boundaries, and interfaces in the wireless network 100. Potential causes of multipath propagation may include, but are not limited, to atmospheric ducting, ionospheric reflection and/or refraction, and/or reflection from terrestrial objects such as mountains and/or buildings to provide some examples.

In some embodiments, for example in a non-coherence mode of operation, the UE 104 can pre-code amplitudes and/or phases of the first transport stream 150.1 and the second transport stream 150.2. In these embodiments, the amplitudes and/or phases of the first transport stream 150.1 and the second transport stream 150.2 are not synchronized with respect to one another in the non-coherence mode of operation. As such, the UE 104 and the base station 102 undergo a feedback procedure to develop channel state information (CSI) for use in pre-coding the multiple transport streams of the UL-MIMO transmission. In these embodiments, the UE 104 can estimate one or more known parameters, characteristics, and/or attributes of the radio link, for example, scattering, fading, and/or power decay over distance, through a process referred to as channel estimation and, thereafter, can return the estimates of these known parameters, characteristics, and/or attributes as the CSI to the base station 102. After developing the CSI, the UE 104 can use the CSI to derive a precoding matrix for transmitting the first transport stream 150.1 and the second transport stream 150.2 over the radio link. In some embodiments, the CSI can include a Rank Indicator (RI) that describes which transmitting antenna ports are to be used by the UE to transmit the first transport stream 150.1 and the second transport stream 150.2 over the radio link. As an example, the UE 104 can include two transmitting antenna ports for transmitting the first transport stream 150.1 and the second transport stream 150.2 to the base station 102 over the radio link. And the base station 102 can include two receiving antenna ports for observing the first transport stream 150.1 and the second transport stream 150.2 as these transport streams propagate through the radio link to form a 2×2 MIMO wireless network. In this example, a value of RANK1 for the RI in the CSI represents a PMI based selection whereby the UE 104 is to use only one transmitting antenna port from among the two transmitting antenna ports to provide the transmitting the first transport stream 150.1 and the second transport stream 150.2 to the base station 102. In this example, a value of RANK2 for the RI in the CSI indicates that the UE 104 is to use the two transmitting antenna ports to provide the first transport stream 150.1 and the second transport stream 150.2 to the base station. In some embodiments, for example a non-coherence RANK2 mode of operation, the UE 104 can select from the following precoding matrix:

$$\frac{1}{\sqrt{2}}\begin{bmatrix} 1 & 0 \\ 0 & 1 \end{bmatrix}, \quad (1)$$

whereby the UE 104 selects this precoding matrix to map the first transport stream 150.1 to a first transmitting antenna port from among the two transmitting antenna ports and the second transport stream 150.2 to a second transmitting antenna port from among the two transmitting antenna ports.

And as illustrated in FIG. 1, the base station 102 can use a first receiving antenna and a second receiving antenna to observe the first transport stream 150.1 as the first transport stream 150.1 propagates through the first signal pathway of the radio link and the second transport stream 150.2 as the second transport stream 150.2 propagates through the second signal pathway of the radio link. In some embodiments, the base station 102 can recover data from the first transport stream 150.1 and the second transport stream 150.2 in the presence of low imbalances, for example, less than between fifteen (15) and sixteen (16) decibels (dBs) of imbalances between signal-to-noise ratios (SNRs) of the first transport stream 150.1 and the second transport stream 150.2. However, the base station 102 may not be able recover data from first transport stream 150.1 and the second transport stream 150.2 in the presence of high imbalances, for example, greater than or equal to between fifteen (15) and sixteen (16) dBs of imbalances between signal-to-noise ratio (SNR) of the first transport stream 150.1 and the second transport stream 150.2. In these embodiments, the base station 102 may not be able recover data from the first transport stream 150.1 and the second transport stream 150.2 while the UE 104 is operating in the non-coherence RANK2 mode of operation, which is to be described in further detail below, in the presence of the high imbalances between the first transport stream 150.1 and the second transport stream 150.2.

As to be described in further detail below, the base station 102 can recover a first recovered transport stream as the first receiving antenna observes the first transport stream 150.1 and the second transport stream 150.2 propagating through the radio link, and recover a second recovered transport stream as the second receiving antenna observes the first transport stream 150.1 and the second transport stream 150.2 propagating through the radio link. In some embodiments, the base station 102 can recover the first recovered transport stream by processing the first transport stream 150.1 and the second transport stream 150.2 as observed by the first receiving antenna over the first signal pathway, and recover the second recovered transport stream by processing the first transport stream 150.1 and the second transport stream 150.2 as observed by the second receiving antenna over the second signal pathway. In the exemplary embodiment illustrated in FIG. 1, the base station 102 can reactively adjust one or more signal metrics of the first recovered transport stream and/or the second recovered transport stream in the presence of the imbalance, especially, the high imbalance, between the first transport stream 150.1 and the second transport stream 150.2. The one or more signal metrics can include a bit error ratio (BER), a symbol error ratio (SER), a signal-to-noise ratio (SNR), and/or any other suitable signal metric of the first recovered transport stream and/or the second recovered transport stream that will be apparent to those skilled in the relevant art(s) without departing from the spirit and scope of the present disclosure. In some embodiments, the base station 102 can inject noise, such as white noise, pink noise, brownian noise, blue noise, violet noise, and/or any other suitable noise that will be apparent to those skilled in the relevant art(s) without departing from the spirit and scope of the present disclosure to provide some examples, into the first recovered transport stream or the second recovered transport stream to reactively adjust the one or more signal metrics of the first recovered transport stream or the second recovered transport stream to lessen the imbalances between the first transport stream 150.1 and the second transport stream 150.2. By injecting the noise into the first recovered transport stream or the second recovered transport stream, the base station 102 can lessen the one or more signal metrics of these recovered transmission streams to lessen the imbalances between the first transport stream 150.1 and the second transport stream 150.2. In some embodiments, the reduction of the one or more signal metrics of these recovered transmission streams causes the signal metrics of the first recovered transport stream and the second recovered transport stream to be closer to each other, thereby lessening the effect of the imbalances between the first transport stream 150.1 and the second transport stream 150.2 on the base station 102. As an example, the base station 102 can observe the first transport stream 150.1 and the second transport stream 150.2 provided by the UE 104 over the radio link using the two receiving antenna to provide the first recovered transport stream and the second recovered transport stream based thereon. In this example, the base station 102 can inject the noise into the first recovered transport stream or the second recovered transport stream with a higher SNR to decrease this higher SNR to lessen the imbalances between the first transport stream 150.1 and the second transport stream 150.2. By lessening the imbalances between the first transport stream 150.1 and the second transport stream 150.2 at the base station 102, the base station 102 can reliably recover the data from the first transport stream 150.1 and the second transport stream 150.2 in the presence of the imbalances, especially, in the presence of the high imbalances, between the first transport stream 150.1 and the second transport stream 150.2.

Alternatively, or in addition to, the UE 104 can proactively adjust one or more signal metrics of the first transport stream 150.1 and the second transport stream 150.2. In some embodiments, the UE 104 can exploit channel reciprocity of the radio link to estimate one or more known parameters, characteristics, and/or attributes of the radio link, for example, scattering, fading, and/or power decay over distance, from multiple transport streams provided to the UE 104 over the radio link using multiple transmitting antenna ports of the base station 102, herein referred to as DL-MIMO transmissions for simplicity. In some embodiments, the UE 104 can estimate one or more known parameters, characteristics, and/or attributes of the radio link for the first transport stream 150.1 and the second transport stream 150.2 from the DL-MIMO transmissions through the channel reciprocity of the radio link. In these embodiments, the UE 104 can determine whether the imbalances, especially, high imbalances, are to be present in the first transport stream 150.1 and the second transport stream 150.2 to be provided by the UE 104 over the radio link to the base station 102. After determining the imbalances are to be present, the UE 104 can proactively adjust one or more signal metrics of the first transport stream 150.1 or the second transport stream 150.2 to lessen the imbalances between these transport streams. The one or more signal metrics can include mean powers, average powers, instantaneous powers, root mean square power level, and/or any other suitable signal metric of the first transport stream 150.1 and the second transport stream 150.2 that will be apparent to those skilled in the relevant art(s) without departing from the spirit and scope of the present disclosure. In some embodiments, the UE 104 can proactively adjust, for example, attenuate and/or amplify, transmit powers of the first transport stream 150.1 or the second transport stream 150.2 to lessen the imbalances between these transport streams. By adjusting the transmit powers the first transport stream 150.1 or the second transport stream 150.2, the UE 104 can decrease the one or more signal metrics of the first transport stream 150.1 or the second transport stream to lessen the imbalances between the first transport stream 150.1 and the second transport stream 150.2. By lessening the imbalances between the first transport stream 150.1 and the second transport stream 150.2 at the UE 104, the base station 102 can reliably recover the data from the first transport stream 150.1 and the second transport stream 150.2 in the presence of the imbalances, especially, in the presence of the high imbalances, between the multiple transport streams of the UL-MIMO transmission.

Figure 2:
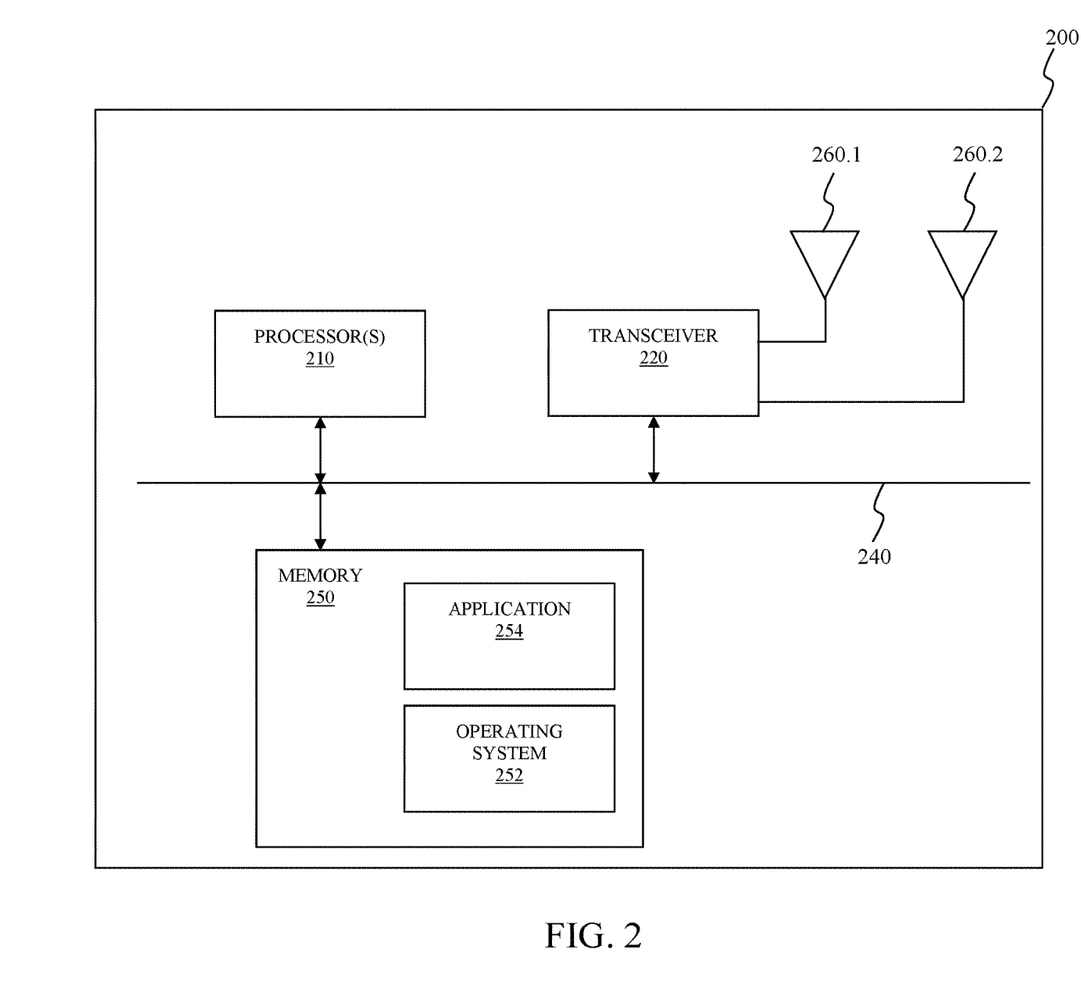
FIG. 2 illustrates a block diagram of an electronic device for lessening the imbalance between the two transport streams of the UL-MIMO transmission according to some aspects of the disclosure.

Exemplary Electronic Device that can be Implemented within the Exemplary Wireless Network FIG. 2 illustrates a block diagram of an electronic device for lessening the imbalance between the two transport streams of the UL-MIMO transmission according to some aspects of the disclosure. In the exemplary embodiment illustrated in FIG. 2, an electronic device 200 may be any of the electronic devices, for example, the base station 102 and/or the UE 104 of the wireless network 100 as described above in FIG. 1. As illustrated in FIG. 2, the electronic device includes a processor 210, one or more transceivers 220, a communication infrastructure 240, a memory 250, an operating system 252, an application 254, a first antenna 260.1 and a second antenna 260.2. The various systems illustrated in FIG. 2 are provided as exemplary parts of the electronic device 200, and the electronic device 200 can include other circuit(s) and subsystem(s). Also, although the systems of the electronic device 200 are illustrated as separate components, the aspects of this disclosure can include any combination of these, less, or more components. Also, the electronic device 200 can include any number of processors, transceivers, communication infrastructures, memories, operating systems, applications, and antennas.

The memory 250 may include random access memory (RAM) and/or cache, and may include control logic (e.g., computer software) and/or data. The memory 250 may include other storage devices or memory such as, but not limited to, a hard disk drive and/or a removable storage device/unit. According to some examples, the operating system 252 can be stored in the memory 250. The operating system 252 can manage transfer of data between the memory 250, the application 254, the processor 210, and/or the transceiver 220. In some examples, the operating system 252 maintains one or more network protocol stacks (e.g., Internet protocol stack, cellular protocol stack, and the like) that can include a number of logical layers. At corresponding layers of the protocol stack, the operating system 252 includes control mechanism and data structures to perform the functions associated with that layer.

According to some examples, the application 254 can be stored in the memory 250. The application 254 can include applications (e.g., user applications) used by a wireless electronic device and/or a user of the wireless electronic device. The applications in the application 254 can include applications such as, but not limited to, radio streaming, video streaming, remote control, and/or other user applications.

The electronic device 200 can also include the communication infrastructure 240. The communication infrastructure 240 provides communication between, for example, the processor 210, the transceiver 220, and the memory 250. In some implementations, the communication infrastructure 240 may be a bus. The processor 210 together with instructions stored in memory 250 can performs operations enabling the electronic device 200 to lessen imbalances between the two transport streams of an UL-MIMO transmission, such as the first transport stream 150.1 and the second transport stream 150.2, as described herein.

The transceiver 220 can transmit and receive communications signals that support the operations of electronic device and may be coupled to the first antenna 260.1 and the second antenna 260.2 to form a 2×2 MIMO system. The first antenna 260.1 and the second antenna 260.2 may include one or more antennas that may be the same or different types. The transceiver 220 allows the electronic device 200 to communicate with other devices that may be wired and/or wireless. In some examples, the transceiver 220 can include processors, controllers, radios, sockets, plugs, buffers, and like circuits/devices used for connecting to and communication on networks. According to some examples, the transceiver 220 include one or more circuits to connect to and communicate on wired and/or wireless networks.

According to some aspects, the transceiver 220 can include a cellular subsystem, a WLAN subsystem, and/or a Bluetooth™ subsystem, each including its own radio transceiver and protocol(s) as will be understood by those skilled arts based on the discussion provided herein. In some implementations, the transceiver 220 can include more or fewer systems for communicating with other devices.

In some examples, the transceiver 220 can include one or more circuits (including a WLAN transceiver) to enable connection(s) and communication over WLAN networks such as, but not limited to, networks based on standards described in IEEE 802.11. Additionally, or alternatively, the transceiver 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, the transceiver 220 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, the transceiver 220a-220n can be configured to operate according to one or more of Rel-15, Rel-16, Rel-17, or other of the 3GPP standards.

According to some aspects, the processor 210, alone or in combination with computer instructions stored within the memory 250, and/or the transceiver 220 can lessen the imbalances between the two transport streams of an UL-MIMO transmission, such as the first transport stream 150.1 and the second transport stream 150.2, as described herein.

Exemplary Operation of the Exemplary Base Station

Figure 3:
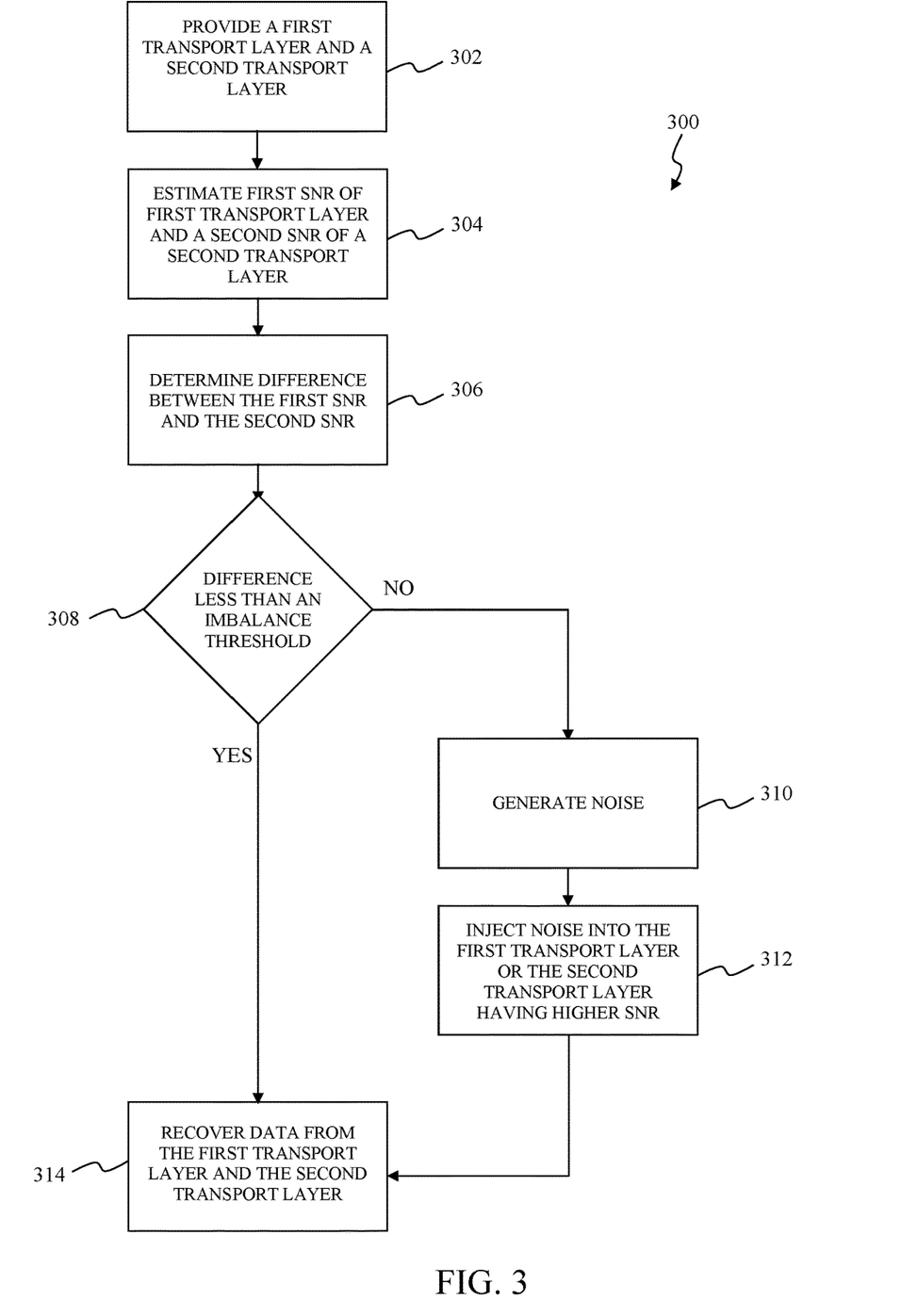
FIG. 3 illustrates a flowchart of an exemplary operation for lessening the imbalance between the two transport streams of the UL-MIMO transmission in accordance with various embodiments of the present disclosure.

FIG. 3 illustrates a flowchart of an exemplary operation for lessening the imbalance between the two transport streams of the UL-MIMO transmission in accordance with various embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 for lessening the imbalance between a first transport stream and a second transport stream of the UL-MIMO transmission, such as the first transport stream 150.1 and the second transport stream 150.2 as described above in FIG. 1 to provide an example. The operational control flow 300 can be executed by a computing system, such as the base station 102 as described above in FIG. 1, the electronic device 200 as described above in FIG. 2, and/or the computer system 500 as to be described in further detail below in FIG. 5.

At operation 302, the operational control flow 300 can provide a first transport layer and a second transport layer based upon a first recovered transport stream and a second recovered transport stream. In some embodiments, the operational control flow 300 can recover a first recovered transport stream by observing the first transport layer and the second transport layer using a first receiving antenna. In these embodiments, the operational control flow 300 can also recover a second recovered transport stream by observing the first transport layer and the second transport layer using a second receiving antenna. For example, the transceiver 220 as described above in FIG. 2 can recover a second recovered transport stream and the second recovered transport stream. In some embodiments, the operational control flow 300 can provide the first transport layer and the second transport layer based upon the first recovered transport stream and the second recovered transport stream. For example, the processor as described above in FIG. 2 can provide the first transport layer and the second transport layer. In some embodiments, the operational control flow 300 can equalize, decode, de-map and/or perform any other suitable processing as described in the Fifth Generation (5G) or NR system standards as provided by Third Generation Partnership Project (3GPP) technical specifications that will be apparent to those skilled in the relevant art(s) without departing from the spirit and scope of the present disclosure to provide the first transport layer and the second transport layer based upon the first transport stream and the second transport stream.

At operation 304, the operational control flow 300 estimates a first SNR of a first transport layer and a second SNR of a second transport layer. For example, the processor 210 as described above in FIG. 2 can estimate the first SNR and the second SNR.

At operation 306, the operational control flow 300 determines a difference between the first SNR from operation 304 and the second SNR from operation 304. In some embodiments, the operational control flow 300 determines the difference to numerically quantify the imbalance between the first transport stream 150.1 and the second transport stream 150.2. For example, the processor 210 as described above in FIG. 2 can determine the difference.

At operation 308, the operational control flow 300 compares the difference from operation 306 and an imbalance threshold, for example, between fifteen (15) and sixteen (16) decibels (dBs), to determine whether to lessen the imbalance between the first transport stream 150.1 and the second transport stream 150.2. For example, the processor 210 as described above in FIG. 2 can compare the difference with the imbalance threshold. The operational control flow proceeds to operation 314 when the difference from operation 306 is less than the imbalance threshold, namely, the low imbalance. The operational control flow proceeds to operation 314 in the presence of the low imbalance to recover data from the first transport layer from operation 304 and/or the second transport layer from operation 304. Otherwise, the operational control flow proceeds to operation 310 when the difference from operation 306 is greater than or equal to the imbalance threshold, namely, the high imbalance. The operational control flow proceeds to operation 310 in the presence of the high imbalance to lessen the imbalance between the first transport stream 150.1 and the second transport stream 150.2 before proceeding to operation 314 to recover data from the first transport layer from operation 304 and/or the second transport layer from operation 304.

At operation 310, the operational control flow 300 generates noise to be injected into the first transport layer from operation 304 or the second transport layer from operation 304 having a higher SNR. For example, the processor 210 as described above in FIG. 2 can generate the noise. In some embodiments, the noise can include white noise, pink noise, brownian noise, blue noise, violet noise, and/or any other suitable noise that will be apparent to those skilled in the relevant art(s) without departing from the spirit and scope of the present disclosure. In some embodiments, the operational control flow 300 can scale a magnitude of the noise according to:

$$n = \frac{1}{\text{linear}(SNR_{value} - \text{SNR\_scalor})}, \quad (2)$$

where n represents the magnitude of the noise, $SNR_{value}$ represents the value, expressed in dB, of the higher SNR of the first SNR from operation 304 and the second SNR from operation 304, SNR_scalor represents a predetermined value that can be empirically determined, for example, through simulation, to cause the difference between the first SNR from operation 304 and the second SNR from operation 304 to be less than the imbalance threshold from operation 308, and the function linear ( ) represents a mathematical conversion from dB to linear.

At operation 312, the operational control flow 300 injects the noise from operation 310 into the first transport layer from operation 304 or the second transport layer from operation 304 having the higher SNR. For example, the processor 210 as described above in FIG. 2 can inject the noise. In some embodiments, the operational control flow 300 injects the noise from operation 312 into the first transport layer from operation 304 when the first SNR from operation 304 is greater than or equal the second SNR from operation 304. In these embodiments, the operational control flow 300 injects the noise from operation 312 into the first transport layer from operation 304 to lessen the first SNR from operation 304 to lessen the high imbalance between the first transport stream 150.1 and the second transport stream 150.2 before proceeding to operation 314. In some embodiments, the operational control flow 300 injects the noise from operation 312 into the second transport layer from operation 304 when the second SNR from operation 304 is greater than or equal the first SNR from operation 304. In these embodiments, the operational control flow 300 injects the noise from operation 312 into the second transport layer from operation 304 to lessen the second SNR from operation 304 to lessen the high imbalance between the first transport stream 150.1 and the second transport stream 150.2 before proceeding to operation 314.

At operation 314, the operational control flow 300 recovers data from the first transport layer from operation 304 and the second transport layer from operation 304. For example, the processor 210 as described above in FIG. 2 can recover the data. In some embodiments, the operational control flow 300 can demodulate, descramble, rate recover, channel decode, and/or perform any other suitable processing as described in the Fifth Generation (5G) or NR system standards as provided by Third Generation Partnership Project (3GPP) technical specifications that will be apparent to those skilled in the relevant art(s) without departing from the spirit and scope of the present disclosure to recover the data from the first transport layer from operation 304 and the second transport layer from operation 304.

Exemplary Operation of the Exemplary Electronic Device

Figure 4:
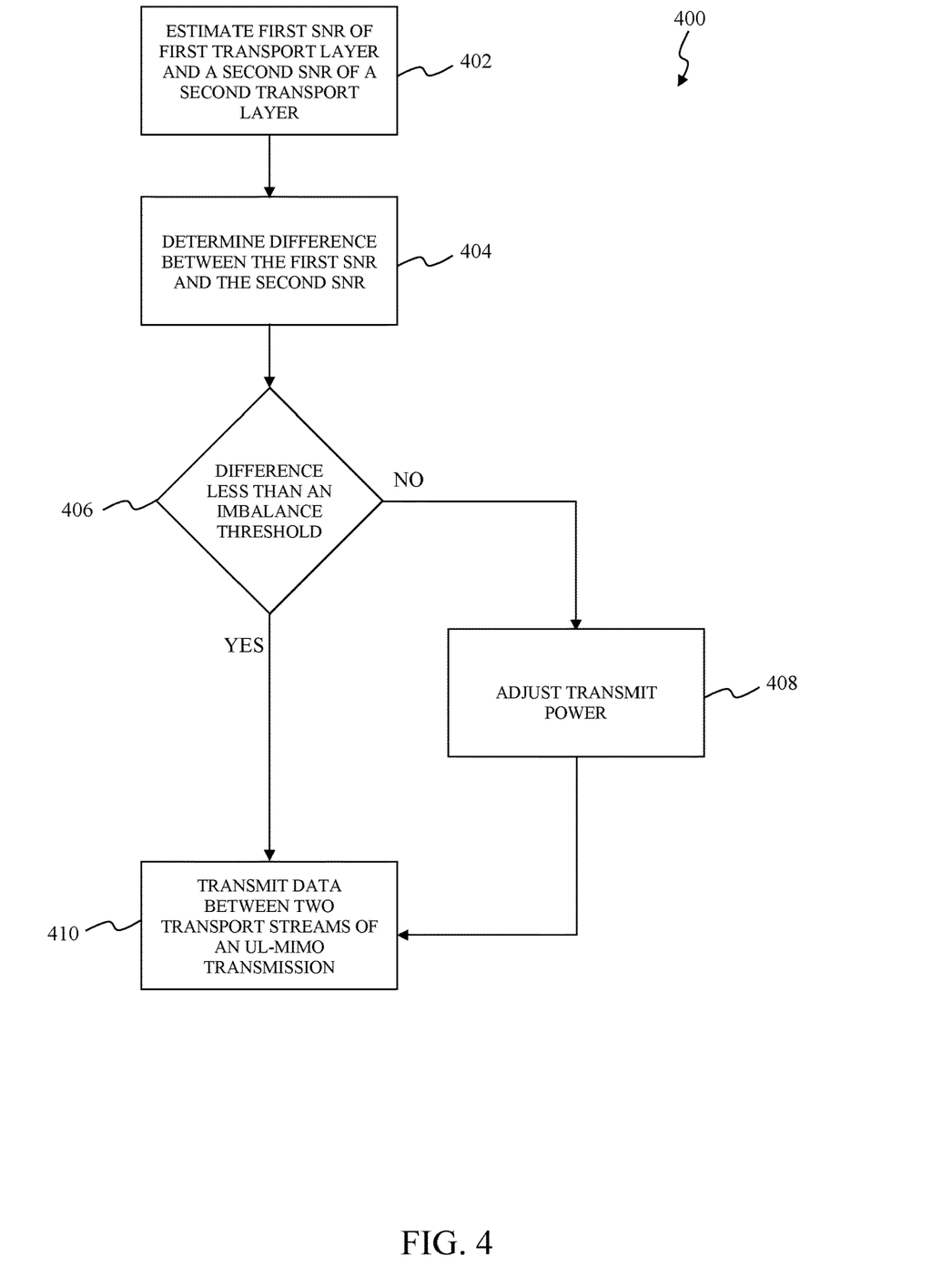
FIG. 4 illustrates a flowchart of another exemplary operation for lessening the imbalance between the two transport streams of the UL-MIMO transmission in accordance with various embodiments of the present disclosure.

FIG. 4 illustrates a flowchart of another exemplary operation for lessening the imbalance between the two transport streams of the UL-MIMO transmission in accordance with various embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 for lessening the imbalance between a first transport stream and a second transport stream of the UL-MIMO transmission, such as the first transport stream 150.1 and the second transport stream 150.2 as described above in FIG. 1 to provide an example. The operational control flow 400 can be executed by a computing system, such as the UE 104 as described above in FIG. 1, the electronic device 200 as described above in FIG. 2, and/or the computer system 500 as to be described in further detail below in FIG. 5.

At operation 402, the operational control flow 400 estimates a first SNR of a first transport stream and a second SNR of a second transport stream. For example, the processor 210 as described above in FIG. 2 can estimate the first SNR and the second SNR. In some embodiments, the operational control flow 400 can exploit channel reciprocity of the radio link to estimate one or more known parameters, characteristics, and/or attributes of the radio link, for example, scattering, fading, and/or power decay over distance, from the transport streams provided to the operational control flow 400 in the DL over the radio link. In some embodiments, the operational control flow 400 can estimate one or more known parameters, characteristics, and/or attributes of the radio link from the DL-MIMO transmissions through the channel reciprocity of the radio link. In these embodiments, the operational control flow 400 can estimate the first SNR of the first transport stream and the second SNR of the second transport stream from these known parameters, characteristics, and/or attributes of the radio link. In some embodiments, the operational control flow 400 can scramble, modulate, layer map, and/or perform any other suitable processing as described in the Fifth Generation (5G) or NR system standards as provided by Third Generation Partnership Project (3GPP) technical specifications that will be apparent to those skilled in the relevant art(s) without departing from the spirit and scope of the present disclosure to format codewords onto the first transport stream and the second transport stream.

At operation 404, the operational control flow 400 determines a difference between the first SNR from operation 402 and the second SNR from operation 402. For example, the processor 210 as described above in FIG. 2 can determine the difference. In some embodiments, the operational control flow 400 determines the difference to numerically quantify the imbalance between the first transport stream 150.1 and the second transport stream 150.2.

At operation 406, the operational control flow 400 compares the difference from operation 404 to an imbalance threshold, for example, between fifteen (15) and sixteen (16) decibels (dBs), to determine whether to lessen the imbalance between the first transport stream 150.1 and the second transport stream 150.2. For example, the processor 210 as described above in FIG. 2 can compare the difference to the imbalance threshold. The operational control flow proceeds to operation 610 when the difference from operation 404 is less than the imbalance threshold, namely, the low imbalance. The operational control flow proceeds to operation 610 in the presence of the low imbalance to transmit the first transport stream 150.1 and the second transport stream 150.2. Otherwise, the operational control flow proceeds to operation 408 when the difference from operation 404 is greater than or equal to the imbalance threshold, namely, the high imbalance. The operational control flow proceeds to operation 408 in the presence of the high imbalance to lessen the imbalance between the first transport stream 150.1 and the second transport stream 150.2 before proceeding to operation 610 to transmit the first transport stream 150.1 and the second transport stream 150.2.

At operation 408, the operational control flow 400 attenuates and/or amplifies transmit powers of the first transport stream 150.1 or the second transport stream 150.2 from operation 404 to lessen the imbalance between the first transport stream 150.1 and the second transport stream 150.2. For example, the processor 210 as described above in FIG. 2 can attenuate and/or amplify the transmit powers. By adjusting the transmit powers of the first transport stream 150.1 or the second transport stream 150.2, the operational control flow 400 can lessen the imbalance between the first transport stream 150.1 and the second transport stream 150.2.

At operation 410, the operational control flow 400 transmits the first transport stream 150.1 and the second transport stream 150.2 over the radio link. For example, the transceiver as described above in FIG. 2 can transmit the first transport stream 150.1 and the second transport stream 150.2 using the first antenna 260.1 and the second antenna 260.2. In some embodiments, the operational control flow 400 can resource element map, pre-code, and/or perform any other suitable processing as described in the Fifth Generation (5G) or NR system standards as provided by Third Generation Partnership Project (3GPP) technical specifications that will be apparent to those skilled in the relevant art(s) without departing from the spirit and scope of the present disclosure to format codewords received over a first transport layer and a second transport layer for transmission as the first transport stream 150.1 and the second transport stream 150.2 over the radio link.

Figure 5:
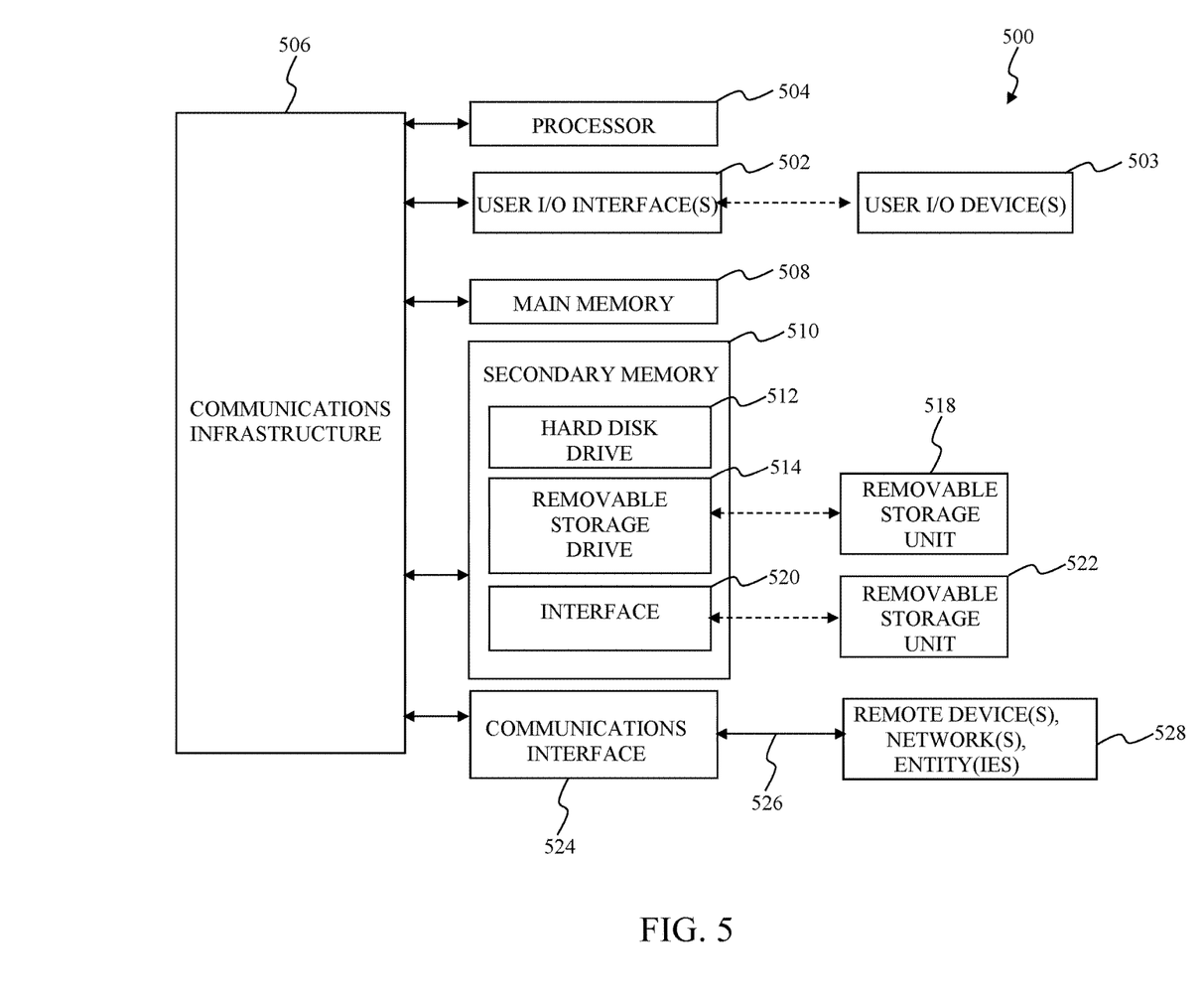
FIG. 5 illustrates a block diagram of an exemplary computer system that can be implemented within the exemplary wireless network according to some exemplary embodiments of the present disclosure.

Exemplary Computer System that can be Implemented within the Exemplary Wireless Network FIG. 5 illustrates a block diagram of an exemplary computer system that can be implemented within the exemplary wireless network according to some exemplary embodiments of the present disclosure. Computer system 500 can be any well-known computer capable of performing the functions described herein such as devices 102, 104 of FIG. 1, and/or 200 of FIG. 2. Computer system 500 includes one or more processors (also called central processing units, or CPUs), such as a processor 504. Processor 504 is connected to a communication infrastructure 506 (e.g., a bus). Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

CONCLUSION

Embodiments of the disclosure can be implemented in hardware, firmware, software application, or any combination thereof. Embodiments of the disclosure can also be implemented as instructions stored on one or more computer-readable mediums, which can be read and executed by one or more processors. A computer-readable medium can include any mechanism for storing or transmitting information in a form readable by a computer (e.g., a computing circuitry). For example, a computer-readable medium can include non-transitory computer-readable mediums such as read only memory (ROM); random access memory (RAM); magnetic disk storage media; optical storage media; flash memory devices; and others. As another example, the computer-readable medium can include transitory computer-readable medium such as electrical, optical, acoustical, or other forms of propagated signals (e.g., carrier waves, infrared signals, digital signals, etc.). Further, firmware, software application, routines, instructions have been described as performing certain actions. However, it should be appreciated that such descriptions are merely for convenience and that such actions in fact result from computing devices, processors, controllers, or other devices executing the firmware, software application, routines, instructions, etc.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan considering the teachings and guidance.

The breadth and scope of the disclosure should not be limited by any of the above-described exemplary embodiments but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:
1. A base station, comprising:
a transceiver configured to:
recover a first recovered transport stream based upon receiving a first transport stream of an uplink (UL)-multiple-input and multiple-output (MIMO) transmission and a second transport stream of the UL-MIMO transmission, wherein the first transport stream and the second transport stream propagate through a first signal pathway of a radio link, and
recover a second recovered transport stream based upon receiving the first transport stream and the second transport stream, wherein the first transport stream and the second transport stream propagate through a second signal pathway of the radio link; and
a processor, coupled to the transceiver, configured to:
de-map the first recovered transport stream and the second recovered transport stream to provide a first transport layer and a second transport layer,
determine a first signal metric of the first transport layer and a second signal metric of the second transport layer,
inject noise into the first transport layer based on the first signal metric being greater than or equal to the second signal metric to lessen an imbalance between the first transport stream and the second transport stream, and inject the noise into the second transport layer based on the first signal metric being less than the second signal metric to lessen the imbalance between the first transport stream and the second transport stream.

2. The base station of claim 1, wherein the transceiver is coupled to:

a first receiving antenna configured to receive the first transport stream and the second transport stream as the first transport stream and the second transport stream propagate through the first signal pathway of the radio link; and a second receiving antenna configured to receive the first transport stream and the second transport stream as the first transport stream and the second transport stream propagate through the second signal pathway of the radio link.

3. The base station of claim 1, wherein the processor is configured to inject the noise into the first transport layer to lessen the first signal metric to cause the first signal metric to be closer to the second signal metric to lessen the imbalance between the first transport stream and the second transport stream.

4. The base station of claim 1, wherein the processor is further configured to:

determine a difference between the first signal metric and the second signal metric;

inject the noise into the first transport layer based on the first signal metric being greater than or equal to the second signal metric and the difference being greater than or equal to an imbalance threshold; and inject the noise into the second transport layer based on the first signal metric being less than the second signal metric and the difference being greater than or equal to the imbalance threshold.

5. The base station of claim 4, wherein the processor is further configured to not inject the noise into the first transport layer or the second transport layer when the difference is less than the imbalance threshold.

6. The base station of claim 1, wherein the first signal metric comprises a first signal-to-noise ratio (SNR) of the first transport layer, and wherein the second signal metric comprises a second SNR of the second transport layer.

7. The base station of claim 6, wherein the processor is further configured to generate the noise having a magnitude according to:

$$n = \frac{1}{\text{linear}(SNR_{value} - \text{SNR\_scalor})},$$

where n represents the magnitude, the $SNR_{value}$ represents a value, expressed in decibels (dBs), of a higher SNR between the first SNR and the second SNR, the SNR_scalor represents a predetermined value that is empirically determined, and the function linear ( ) represents a mathematical conversion from dB to linear.

8. A method performed by a base station, the method comprising:

de-mapping, by the base station, a first recovered transport stream that was recovered based upon receiving a first transport stream and a second transport stream and a second recovered transport stream that was recovered based upon receiving the first transport stream and the second transport stream to provide a first transport layer and a second transport layer, respectively;

determining, by the base station, a first signal metric of the first transport layer and a second signal metric of the second transport layer;

injecting, by the base station, noise into the first transport layer based on the first signal metric being greater than or equal to the second signal metric to lessen an imbalance between the first transport stream and the second transport stream; and injecting, by the base station, the noise into the second transport layer based on the first signal metric being less than the second signal metric to lessen the imbalance between the first transport stream and the second transport stream.

9. The method of claim 8, further comprising:

recovering, by the base station using a first receiving antenna, the first recovered transport stream based upon processing the first transport stream and the second transport stream, wherein the first transport stream and the second transport stream propagate through a first signal pathway of a radio link; and recovering, by the base station using a second receiving antenna, the second recovered transport stream based upon processing the first transport stream and the second transport stream, wherein the first transport stream and the second transport stream propagate through a second signal pathway of the radio link.

10. The method of claim 8, wherein the injecting the noise into the first transport layer comprises injecting the noise into the first transport layer to lessen the first signal metric to cause the first signal metric to be closer to the second signal metric to lessen the imbalance between the first transport stream and the second transport stream.

11. The method of claim 9, further comprising:

determining a difference between the first signal metric and the second signal metric, wherein the injecting the noise into the first transport layer comprises injecting the noise into the first transport layer based on the first signal metric being greater than or equal to the second signal metric and the difference being greater than or equal to an imbalance threshold, and wherein the injecting the noise into the second transport layer comprises injecting the noise into the second transport layer based on the first signal metric being less than the second signal metric and the difference being greater than or equal to the imbalance threshold.

12. The method of claim 11, further comprising not injecting the noise into the first transport layer or the second transport layer when the difference is less than the imbalance threshold.

13. The method of claim 9, wherein the first signal metric comprises a first signal-to-noise ratio (SNR) of the first transport layer, and wherein the second signal metric comprises a second SNR of the second transport layer.

14. The method of claim 13, further comprising generating the noise having a magnitude according to:

$$n = \frac{1}{\text{linear}(SNR_{value} - \text{SNR\_scalor})},$$

where n represents the magnitude, the $SNR_{value}$ represents a value, expressed in decibels (dBs), of a higher SNR between the first SNR and the second SNR, the SNR_scalor represents a predetermined value that is empirically determined through simulation, and the function linear ( ) represents a mathematical conversion from dB to linear.

15. A base station, comprising:
a memory configured to store instructions; and
a processor configured to execute the instructions stored in the memory, the instructions, when executed by the processor, configuring the processor to:
  de-map a first recovered transport stream that was recovered based upon receiving a first transport stream and a second transport stream and a second recovered transport stream that was recovered based upon receiving the first transport stream and the second transport stream to provide a first transport layer and a second transport layer, respectively,
  determine a first signal-to-noise ratio (SNR) of the first transport layer and a second SNR of the second transport layer,
  inject noise into the first transport layer based on the first SNR being greater than or equal to the second SNR to lessen an imbalance between the first transport stream and the second transport stream,
  inject the noise into the second transport layer based on the first SNR being less than the second SNR to lessen the imbalance between the first transport stream and the second transport stream, and
  after injecting the noise into the first transport layer or the second transport layer, recover data from the first transport layer and the second transport layer.

16. The base station of claim 15, further comprising:
a transceiver configured to:
  recover, using a first receiving antenna, the first recovered transport stream based upon receiving the first transport stream and the second transport stream, wherein the first transport stream and the second transport stream propagate through a first signal pathway of a radio link; and
  recover, using a second receiving antenna, the second recovered transport stream based upon receiving the first transport stream and the second transport stream, wherein the first transport stream and the second transport stream propagate through a second signal pathway of the radio link.

17. The base station of claim 15, wherein the instructions, when executed by the processor, configure the processor to inject the noise into the first transport layer to lessen the first SNR to cause the first SNR to be closer to the second SNR to lessen the imbalance between the first transport stream and the second transport stream.

18. The base station of claim 15, wherein the instructions, when executed by the processor, further configure the processor to:
  determine a difference between the first SNR and the second SNR;
  inject the noise into the first transport layer based on the first SNR being greater than or equal to the second SNR and the difference being greater than or equal to an imbalance threshold; and
  inject the noise into the second transport layer based on the first SNR being less than the second SNR and the difference being greater than or equal to the imbalance threshold.

19. The base station of claim 18, wherein the instructions, when executed by the processor, further configure the processor to not inject the noise into the first transport layer or the second transport layer when the difference is less than the imbalance threshold.

20. The base station of claim 15, wherein the instructions, when executed by the processor, further configure the processor to generate the noise having a magnitude according to:

$$n = \frac{1}{\text{linear}(SNR_{value} - SNR\_scalor)},$$

where n represents the magnitude, the $SNR_{value}$ represents a value, expressed in decibels (dBs), of a higher SNR between the first SNR and the second SNR, the SNR_scalor represents a predetermined value that is empirically determined through simulation, and the function linear ( ) represents a mathematical conversion from dB to linear.

* * * * *